United States Patent Office 3,476,646
Patented Nov. 4, 1969

3,476,646
METHOD FOR THE MICROBIOLOGICAL PRODUCTION OF CAROTENES
Zdzislaw Pazola, Henryk Switek, Jozef Janicki, and Wanda Michnikowska, Poznan, Poland, assignors to Centralne Laboratorium Przemyslu Koncentratow Spozywczych, Poznan, Poland
No Drawing. Filed Jan. 25, 1967, Ser. No. 611,566
Claims priority, application Poland, Jan. 26, 1966, P 112,642
Int. Cl. C12b 1/00; C12k 1/10
U.S. Cl. 195—28  9 Claims

ABSTRACT OF THE DISCLOSURE

Carotenes are microbiologically produced by cultivating opposite mated strains of Blakeslea trispora NRRL 2895 (+) and 2896 (−) in a liquid medium in which there is used as a lipid source, an autoclave oil having an iodine value above 100. Autoclave oils are by-products which are recovered from bleaching materials used in the refining of vegetable oils such as soybean and linseed oil.

---

This invention relates to the production of carotenes by microbiological fermentation processes and more particularly to an improved method of production of carotenes by the aerobic cultivation of sexually opposite mated strains of fungi belonging to the family Choanephoraceae in a liquid aqueous medium containing normal nutrient substances such as: protein, carbohydrate and lipid sources, and also vitamins, mineral salts and hydrocarbons, wherein a new lipid source namely oil industry by-products, which are so-called "autoclave oils" having an iodine value above 100, recovered from bleaching materials after the refining of vegetable oils are used.

The microbiological production of carotenes by the aerobic cultivation of mated strains of fungi, such as those of the genera Choanephora and Blakeslea is well known in the art. In the known carotene production by the cultivation of mated strains of Blakeslea trispora NRRL 2895 (+) and NRRL 2896 (−), lipid materials such as naturally occurring vegetable oils or animal fats are normally added to the fermentation medium. For example, in Applied Microbiology, vol. 12, No. 2, pp. 150–154, 1964, the addition of such vegetable oils as soybean oil, cottonseed oil and corn oil is recommended. In U.S. Patent No. 3,025,221, the use of choice white grease is advised.

The addition of vegetable oils or animal fats to fermentation media in the microbiological production of carotenes causes the stimulation of carotene synthesis, probably due to the fatty acid content in the lipid material employed.

It has now been discovered, in accordance with the present invention, that a better effect may be attained in carotene biosynthesis by using a kind of lipid material which is different from naturally occuring oils or fats. More particularly, it has been found that specific oil industry by-products, which are obtained in oil recovering processes from bleaching material after the refining of vegetable oils, give a much better and enhanced effect on carotene yield than the naturally occurring raw or refined vegetable oils. These by-products, which are so called "autoclave oils," contain, due to the specific adsorption phenomenon on bleaching material, not only a very suitable fatty acid composition, but principally in being compared favorably with naturally occurring vegetable oils, they contain considerable amounts of chlorophyll, carotenoids and related compounds, different gums or slimy substances, and other unknown active substances which are stimulative factors in carotene biosynthesis, which together with the contained fatty acids have an advantageous influence on the yield of carotene in the fermentation process.

According to the invention, the addition of so-called "autoclave oils" which are oil-industry by-products obtained in the refining of vegetable oils, used at levels from about 3 percent to 6 percent of the liquid medium, can replace the more expensive vegetable oils or animal fats which are several times more costly, while at the same time obtaining higher carotene yields in fermentation processes.

The enhanced effect on the carotene yield caused by the addition of so-called "autoclave oils," which are recovered from bleaching material in vegetable oil refining processes, depends on the composition of the other nutrient substances used as adjuncts in the fermentation media and which comprise 5–40% of the media. The following examples are given by way of illustration and are not intended as a limitation of this invention. Indeed, many modifications may be made without departing from the spirit and scope thereof.

EXAMPLE 1

The following liquid medium is prepared:

| | Parts by weight |
|---|---|
| Brewer's yeast, dried | 3 |
| Corn, ground whole | 2.5 |
| Soybean, ground whole | 3 |
| Kerosene, deodorized | 4 |
| Thiamine hydrochloride | 0.0002 |
| "Autoclave oil," recovered from bleaching material used in the refining of soybean oil or linseed oil | 4.6 |
| Tap water | 95 |

The above mentioned medium is sterilized for 45–60 minutes at 121° C., cooled and inoculated by adding 5–10 volume percent of a liquid inoculum obtained by 2 days' cultivation of mater strains of Blakeslea trispora NRRL 2895 (+) and NRRL 2896 (−). The inoculated medium is then incubated under aerobic conditions at 26–28° C. for 4–6 days. After 48 hours incubation, there is added aseptically α- or β-ionone in an amount of 0.0935 part by weight to the fermentation medium. After achieving the maximal carotene concentration, which usually occurs after 5 days of fermentation, the mycelium is recovered by filtration—for example through a rotary filter—and dried in vacuum or on an atmospheric double drum dryer.

The carotene preparation, obtained in the form of dried mycelium, may be used directly for feed vitaminization or may be extracted in a known way to obtain a carotene preparation in oil for the coloring or vitaminization of food products. The carotene yields obtained in this fermentation process are about 95 mg./100 ml. of medium.

EXAMPLE 2

The following medium is prepared:

| | Parts by weight |
|---|---|
| Yeast, dried | 3 |
| Corn, ground whole | 2.5 |
| Soybean, ground whole | 3 |
| Citrus molasses | 5 |
| Kerosene, deodorized | 4 |
| Thiamine hydrochloride | 0.0002 |
| "Autoclave oil," recovered from bleaching material used in the refining of soybean oil | 4.6 |
| Tap water | 95 |

The sterilization and the whole production process of carotene by fermentation is conducted in the same manner as described in Example 1 through the addition of α- or β-ionone (after 48 hours incubation).

The carotene yield obtained in this fermentation process is about 100 mg./100 ml. of medium.

EXAMPLE 3

The following medium is prepared:

|  | Parts by weight |
|---|---|
| Cottonseed embryo meal | 5 |
| Corn, ground whole | 2.5 |
| Citrus molasses | 5 |
| Kerosene, deodorized | 4 |
| Thiamine hydrochloride | 0.0002 |
| "Autoclave oil," recovered from bleaching material used in the refining of soybean oil | 4.6 |
| Tap water | 95 |

The sterilization and the whole process for producing carotene by fermentation is conducted in the same manner as described in Example 1, through the addition of α- or β-ionone.

The carotene yield obtained in this fermentation process is about 100 mg./100 ml. of medium.

EXAMPLE 4

|  | Parts by weight |
|---|---|
| Cottonseed embryo meal | 5 |
| Corn, ground whole | 2.5 |
| Kerosene, deodorized | 4 |
| Thiamine hydrochloride | 0.0002 |
| "Autoclave oil," recovered from bleaching material used in the refining of soybean oil | 4.6 |
| Tap water | 95 |

The sterilization and the whole process for producing carotene by fermentation is conducted in the same manner as described in Example 1.

The carotene yield obtained in this fermentation process are about 95 mg./100 ml. of medium.

EXAMPLE 5

The following medium is prepared:

|  | Parts by weight |
|---|---|
| Soybean, ground whole | 4 |
| Corn, ground whole | 2 |
| Citrus molasses | 5 |
| Kerosene, deodorized | 3.2 |
| Thiamine hydrochloride | 0.0002 |
| "Autoclave oil," recovered from bleaching material used in the refining of soybean oil | 3.7 |
| Tap water | 95 |

The sterilization and the whole process of producing carotene by fermentation is conducted in the same manner as described in Example 1, through the addition of α- or β-ionone.

The carotene yields obtained in this fermentation process is about 95 mg./100 ml. of medium.

EXAMPLE 6

The following medium is prepared:

|  | Parts by weight |
|---|---|
| Yeast, dried | 2 |
| Soybean, ground whole | 2 |
| Corn, ground whole | 2 |
| Citrus molasses | 5 |
| Kerosene, deodorized | 3.2 |
| Thiamine hydrochloride | 0.0002 |
| "Autoclave oil," recovered from bleaching material used in the refining of soybean oil | 3.7 |
| Tap water | 95 |

The sterilization and the whole process of producing carotene are conducted in the same manner as described in Example 1, through the addition of α- or β-ionone.

The carotene yield obtained in this fermentation process is about 100 mg./100 ml. of medium.

Comparative fermentation experiments were made on a laboratory scale in shaken-flask cultures, using various medium components including different "autoclave oils" and refined soybean oil. The obtained carotene yields are summarized in Table 1.

TABLE 1

| The basic medium formula as in example— | The kind of stimulating agent | The kind of lipid source | Dried mycelium in g. per 100 ml. medium | Carotene concentration in dried mycelium in mg./g. | Carotene yield in mg. per 100 ml. medium | Yield coefficient in percent |
|---|---|---|---|---|---|---|
| 1 | β-Ionone | Soybean oil, refined | 7.0 | 10.4 | 72.8 | 100 |
| 1 | do | "Autoclave oil," recovered from bleaching material used in refining of linseed oil | 7.0 | 11.95 | 83.65 | 114.9 |
| 1 | do | "Autoclave oil," recovered from bleaching material used in refining of soybean oil. | 7.05 | 13.7 | 96.6 | 132.7 |
| 2 | Citrus molasses | Soybean oil, refined | 7.7 | 10.25 | 91.6 | 100 |
| 2 | do | "Autoclave oil," recovered from bleaching material used in refining of soybean oil. | 7.85 | 13.1 | 102.8 | 112.1 |
| 3 | Citrus molasses | Soybean oil, refined | 7.5 | 13.75 | 103.1 | 100 |
| 3 | do | "Autoclave oil," recovered from bleaching material used in refining of soybean oil. | 6.25 | 17.25 | 107.8 | 104.6 |
| 4 | β-Ionone | Soybean oil, refined | 6.2 | 11.45 | 71 | 100 |
| 4 | do | "Autoclave oil," recovered from bleaching material used in refining of soybean oil. | 6.1 | 14.5 | 88.45 | 124.6 |
| 4 | None | Soybean oil, refined | 6.1 | 6.0 | 36.6 | 100 |
| 4 | do | "Autoclave oil," recovered from bleaching material used in refining of soybean oil. | 6.15 | 9.9 | 60.9 | 166.4 |
| 5 | Citrus molasses | Soybean oil, refined | 6.6 | 13.4 | 88.4 | 100 |
| 5 | do | "Autoclave oil," recovered from bleaching material used in refining of soybean oil. | 6.4 | 14.75 | 94.4 | 106.8 |
| 6 | Citrus molasses | Soybean oil, refined | 6.9 | 14.5 | 100.05 | 1 |
| 6 | do | "Autoclave oil," recovered from bleaching material used in refining of soybean oil. | 6.6 | 15.75 | 103.95 | 103.9 |

We claim:

1. A process for the production of carotene comprising cultivating fungi of the family Choanephoraceae in a liquid medium containing protein and carbohydrate sources and about 3–6% by weight of the liquid medium of an autoclave oil, having an iodine value above 100, said autoclave oil being a by-product recovered from bleaching materials which are used in the refining of vegetable oils, and recovering the carotene.

2. A process as claimed in claim 1, wherein the fungi include opposite mated strains.

3. A process as claimed in claim 2, wherein the fungi are *Blakeslea trisopora* NRRL 2895 (+) and NRRL 2896 (−).

4. A process as claimed in claim 3, wherein the medium further contains a hydrocarbon and a vitamin.

5. A process as claimed in claim 4, wherein the fungi are introduced into the medium in the form of a liquid inoculum which is added at about 5–10 percent by volume to the medium whereafter the medium is incubated under aerobic conditions at about 26–28° C. for about 4–6 days.

6. A process as claimed in claim 5, wherein the hydrocarbon is kerosene and the vitamin is thiamine hydrochloride.

7. A method for the production of carotene comprising cultivating oppositely mated strains of the fungi, *Blakeslea trispora* NRRL 2895 (+) and NRRL 2896 (−) in a liquid medium containing protein and carbohydrate sources and further containing a lipid source which is an autoclave oil having an iodine value above 100, said autoclave oil being a by-product recovered from bleaching materials which are used in the refining of vegetable oils; and then recovering the carotene.

8. A method as claimed in claim 7, wherein the autoclave oil is present in an amount of about 3–6% by weight based on the weight of the liquid medium.

9. A method as claimed in claim 7 wherein the vegetable oil is soybean or linseed oil.

References Cited

UNITED STATES PATENTS

| | | | |
|---|---|---|---|
| 3,025,221 | 3/1962 | Ciegler et al. | 195—28 |
| 3,291,701 | 12/1966 | Fulde | 195—28 |

ALVIN E. TANENHOLTZ, Primary Examiner

U.S. Cl. X.R.

195—100, 114